United States Patent
Metni

(10) Patent No.: US 7,028,542 B2
(45) Date of Patent: Apr. 18, 2006

(54) REDUCED DRAG CABLE FOR USE IN WIND TUNNELS AND OTHER LOCATIONS

(76) Inventor: N. Alan Metni, 8847 Cypress Reserve Cir., Orlando, FL (US) 32836

( * ) Notice: Subject to any disclaimer, the term of this patent is extended or adjusted under 35 U.S.C. 154(b) by 0 days.

(21) Appl. No.: 11/184,940

(22) Filed: Jul. 19, 2005

(65) Prior Publication Data

US 2006/0021428 A1    Feb. 2, 2006

Related U.S. Application Data

(63) Continuation-in-part of application No. 10/909,088, filed on Jul. 30, 2004.

(51) Int. Cl.
    *G01M 9/00* (2006.01)
(52) U.S. Cl. ........................................ 73/147
(58) Field of Classification Search ............... 73/147; 244/3.24, 23 A, 23 C; 434/43, 44, 49; 267/136; 14/21
    See application file for complete search history.

(56) References Cited

U.S. PATENT DOCUMENTS

| | | | |
|---|---|---|---|
| 2,167,098 A | 7/1939 | Wells | |
| 3,538,702 A | 11/1970 | Wolf et al. | |
| 3,667,206 A | 6/1972 | Gilmore | |
| 3,864,776 A * | 2/1975 | Hedefine et al. | 14/21 |
| 3,922,841 A | 12/1975 | Katsumora et al. | |
| 3,991,550 A | 11/1976 | Cohen | |
| 4,158,283 A | 6/1979 | Nation | |
| 4,311,001 A | 1/1982 | Clushko et al. | |
| 4,487,010 A | 12/1984 | Chiappetto et al. | |
| 4,506,500 A | 3/1985 | Miyanchi et al. | |
| 4,515,100 A | 5/1985 | Grierson | |
| 4,560,147 A | 12/1985 | Bowdren | |
| 4,809,492 A | 3/1989 | Fischer | |
| 5,418,333 A | 5/1995 | Sanders | |
| 5,655,909 A * | 8/1997 | Kitchen et al. | 434/44 |
| 5,791,636 A * | 8/1998 | Loziuk | 267/136 |
| 6,811,877 B1 | 11/2004 | Haisler et al. | |
| 2003/0010966 A1 | 1/2003 | Sjostedt | |
| 2004/0032372 A1 | 2/2004 | Mckim | |

* cited by examiner

*Primary Examiner*—William Oen
(74) *Attorney, Agent, or Firm*—Patent law Offices of Rick Martin, PC

(57) ABSTRACT

A reduced drag cable for use in vertical wind tunnels and other applications with a change in the spacing and/or size of the strands of a standard twisted wire cable is disclosed. The perimeter strands of one embodiment all have a standard diameter, with the exception of one or more wires with different diameter from the other perimeter strands. The different sized strand forms a helical feature around the cable, creating a non-circular profile to reduce drag in air.

15 Claims, 5 Drawing Sheets

REDUCED DRAG CABLE FOR USE IN WIND TUNNELS AND OTHER LOCATIONS

CROSS REFERENCE APPLICATIONS

This application is a continuation in part of U.S. application Ser. No. 10/909,088 filed Jul. 30, 2004.

BACKGROUND

Wind tunnels are well known in the art. Wind tunnels are available in many types and styles depending upon the needs of the user. These include subsonic wind tunnels with and without return flow, transonic wind tunnels with and without return flow, vertical subsonic wind tunnels with and without return flow, supersonic and hypersonic wind tunnels with and without return flow, and compressible flow wind tunnels.

Vertical wind tunnels can be used for simulating skydiving and other human flight applications. For examples, see U.S. Pat. Nos. 5,655,909 and 6,083,110. Fliers in a vertical wind tunnel are free to move about inside flight chamber, it is therefore necessary to constrain their movement to appropriate parts of the system. While it is possible to put a safety net on either the upstream or downstream ends of the flight chamber, or both, using standard cables, these produce an enormous amount of drag which creates noise and increases the power required to attain any given speed. In fact, such a pair of nets can consume as much as 30% to 50% of the total power required to operate such a wind tunnel.

It is also helpful to have a woven grid of cables at the bottom or upstream end of the flight chamber for use as a standing platform when the occupants are not flying. This "cable floor" provides a convenient work platform for the safety officers or instructors in the flight chamber.

Therefore, for the above safety and usability reasons, it is desirable to have a cable floor/safety net made from cables with the lowest amount of aerodynamic drag possible for a given strength and diameter. In addition to wind tunnels, there are any number of applications employing cables moving through the air or air flowing over cables in which a simple and inexpensive reduced drag cable could provide substantial benefits.

Low drag cables with flat or airfoil shaped cross sections are know in the art and are used frequently in the aircraft industry. However, these are not useful in a woven cable floor for a vertical wind tunnel because it is difficult to keep such cables oriented properly in relation to the airflow. Furthermore, the downstream end of such a flat or airfoil type cable is pointed. Since it is the down stream end that a person falling onto the cable floor/safety net will land on, this type of cable is not safe for this type of application. The prior art airfoil type of cables cannot be used in some other types of applications where low drag cables would be desirable, for similar reasons of orientation, stability, cost or injury potential.

Vertical wind tunnels used for freefall simulation often have to operate in noise sensitive environments such as amusement parks and shopping malls. Horizontal testing tunnels can be located away from the crowds where they are free to make as much noise as is necessary. Therefore improvements that reduce the noise generated by the device are of a benefit. The cable floor/safety net is a significant contributor to the overall noise emitted from a vertical wind tunnel.

As amusement devices, freefall simulators must compete with other amusements on the basis of price and can often be operated on a near continual basis. These two factors make energy efficiency critical to successful commercial operation of a freefall simulator. Energy efficiency is much less important for horizontal testing tunnels in which one often takes hours or days to set up an experiment and then only runs the tunnel for a few minutes to collect the necessary data.

To make a commercially viable vertical wind tunnel for skydiving simulation, it is desirable to (1) move enough air and do so smoothly enough to adequately simulate freefall for one or more persons in the flight chamber; (2) with a device that is short enough and quiet enough to be located where large numbers of potential customers tend to be; and, (3) at power consumption levels low enough to make the price of the experience acceptable to the public. Similarly, constraining the occupants to the safe areas of the wind tunnel without increasing drag and power consumption is important.

The foregoing example of the related art and limitations related therewith are intended to be illustrative and not exclusive. Other limitations of the related art will become apparent to those of skill in the art upon a reading of the specification and a study of the drawings.

SUMMARY

An aspect of the present wind tunnel is to provide a vertical wind tunnel amusement device that tries to maximize efficiency while minimizing the height of the device.

An aspect of the present device is to provide a cable with reduced drag and noise in moving air.

Other aspects of this device will appear from the following description and appended claims, reference being made to the accompanying drawings forming a part of this specification wherein like reference characters designate corresponding parts in the several views.

In a veridical wind tunnel the airflow passes through a "cable floor" into the flight chamber. The cable floor provides support for the users when the airflow through the flight chamber is not sufficient to support them.

The cable floor is made from reduced drag cables comprised of a collection of round strands in a particular orientation and of particular sizes. These cables can also be used in any application where a reduced drag in air would be advantageous.

Before explaining the disclosed embodiments of the present device in detail, it is to be understood that the device is not limited in its application to the details of the particular arrangements shown, since the device is capable of other embodiments. Also, the terminology used herein is for the purpose of description and not of limitation.

DETAILED DESCRIPTION OF THE DRAWINGS

Figure 1:
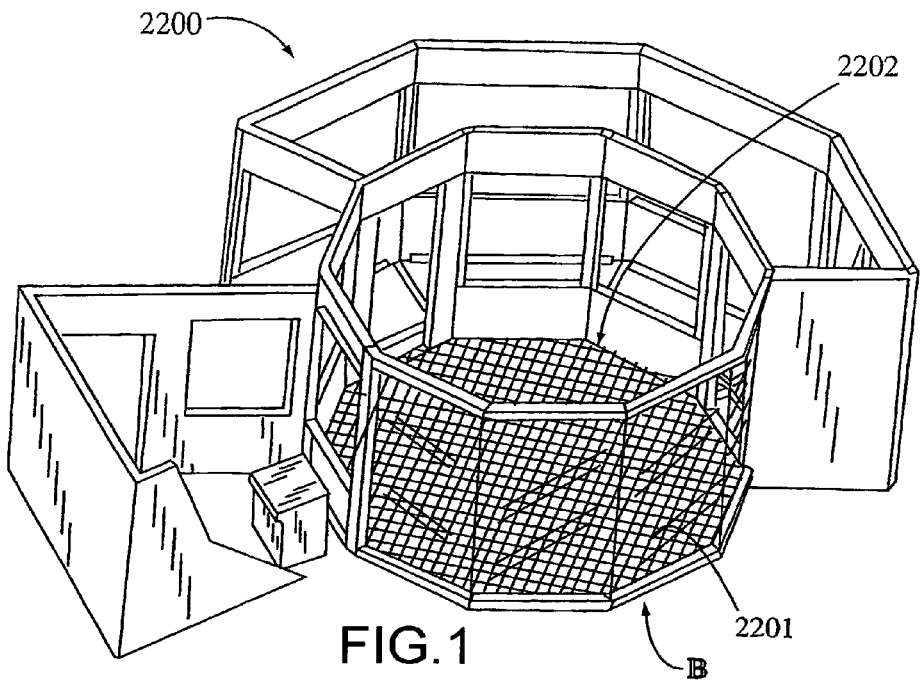
FIG. 1 is a top perspective view of a flight chamber in a veridical wind tunnel with a cable floor.

Referring first to FIG. 1, a vertical wind tunnel for use simulating skydiving has a staging area 2200 and a flight chamber 2202 with a bottom B consisting of a mesh net 2201 is shown.

One embodiment of the mesh net forming the floor of the flight chamber is a 3/32-17-strand stainless steel aircraft cable woven into a 2'×2' (60 cm×60 cm) grid. One or both ends of the cable are run through a compression spring, depending on the conditions of the particular application. One hundred-twenty two (122) cables make up the tunnel floor depicted. The number of cables will depend on the shape and size of the flight chamber 2202, the maximum number of fliers planned for the flight chamber and other design considerations.

The compression of the springs is adjusted to give the proper "bounce" to the floor providing increased safety should a flyer become unstable and fall to the cable floor.

Figure 2:
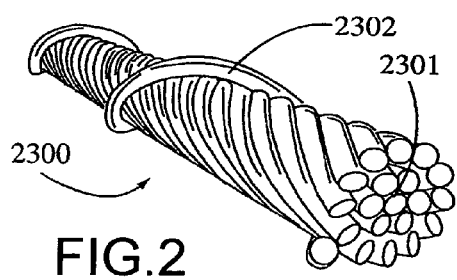
FIG. 2 is a side perspective view of an anti-drag cable, first embodiment.
Figure 3:
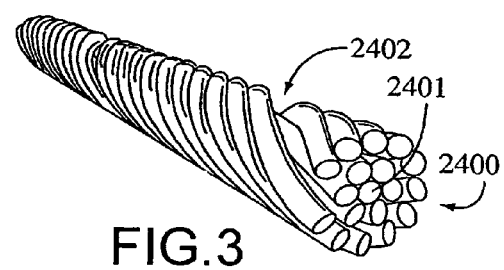
FIG. 3 is a view of a second embodiment cable.
Figure 4:
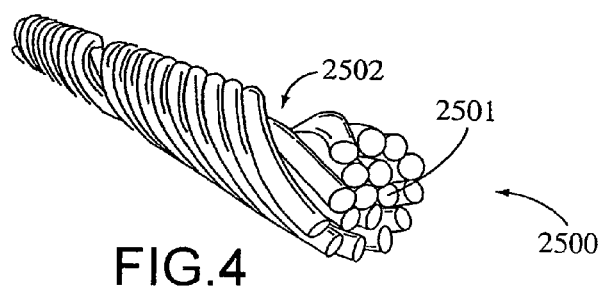
FIG. 4 is view of a third embodiment cable.

FIGS. 2, 3, 4 offer individual cable designs which could form woven net 2201. Basic aerodynamics teaches that a cylinder shape creates extremely high drag when placed in an airflow. It is well known that a helical ridge or groove added to such a cylinder reduces the amount of vortex shedding and consequently reduces the aerodynamic drag of such a shape. Cable 2300 has a standard twisted element core 2301 with an external helical wrap 2302 as shown in FIG. 2.

Cable 2400 has a modified twisted element core 2401 with a single helical element 2402 missing as shown in FIG. 3.

Cable 2500 has a modified twisted core 2501 with double helical elements 2502 missing as shown in FIG. 4.

Figure 5:
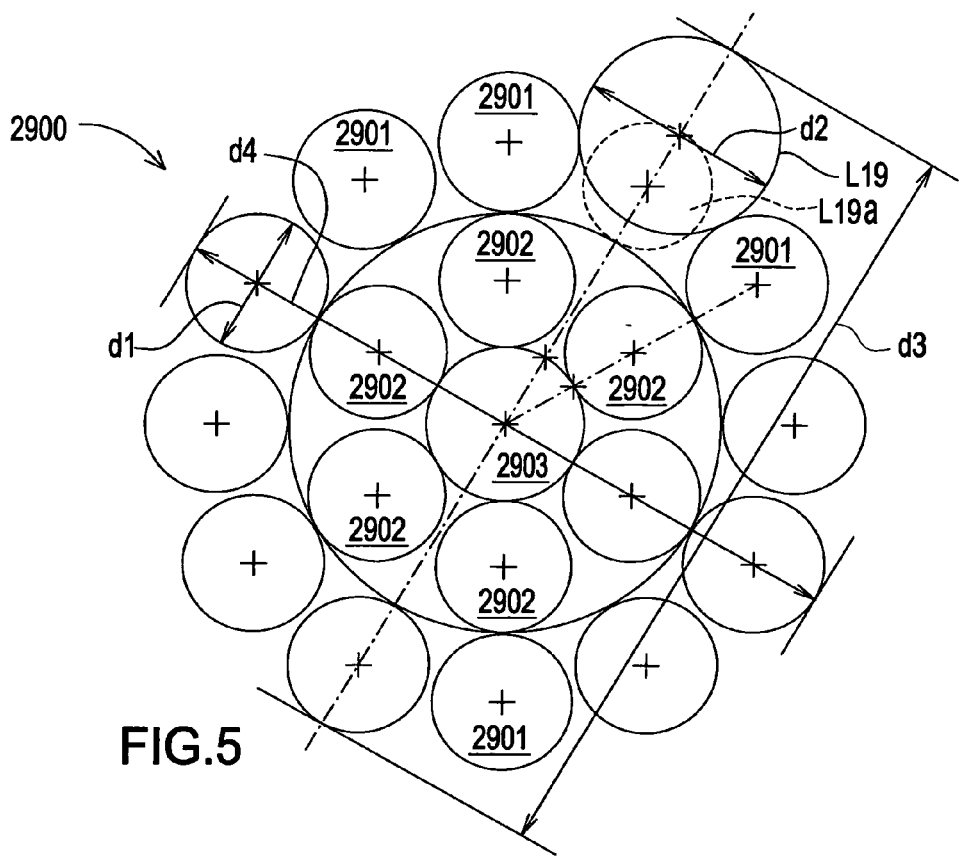
FIG. 5 is a cross sectional, schematic view of a cable with a single outer strand a different size from the other outer strands.

Referring next to FIG. 5 the depicted embodiment of cable 2900 has eighteen strands. Strands 2901 form an outer cable perimeter and have approximately equal diameters $d_1$. $D_1$ is about 0.4826 mm (0.019 inch) in the depicted embodiment. Strand L19 completes the outer cable perimeter and has a diameter of $d_2$, which is different from $d_1$. In the depicted embodiment of FIG. 29, strand L19, shown in the solid line, has a larger-diameter of about 0.7112 mm (0.028 inch). The strand L19a, shown in dotted lines, has a smaller diameter than strands 2901.

$D_2$ should be at least 10% different from $d_1$, more commonly $D_2$ will be 25% or more different from $d_1$. In those embodiments where $d_2$ is larger than $d_1$, $d_2$ can be as much as 250% the size of $d_1$. Other amounts of size variation would work in a similar fashion. When $d_2$ is smaller, the minimum size of $d_2$ will be determined by structural considerations. Strand L19a must be of sufficient size to not break in use and to hold the two adjacent strands 2901 apart at least minimally. The number of strands will depend on the application the cable will be used in. In principle, cables with 6 or more strands could be made according to the present disclosure and function accordingly.

The inner strands 2902, 2903 can have different diameter from strands 2901 and form the core of the cable 2900. Center strand 2903 can have a different diameter from strands 2902. It is irrelevant what the diameter of inner strands 2902 and 2903 is in relation to the diameter $d_2$ L19.

In the depicted embodiment of 2900 with L19 the ratio of $D_2/D_1$ is about 1.47, wherein the diameter $d_3$ is about 10% larger than a uniform strand diameter $d_4$. The cable 2900 is a twisted strand type with strand L19 forming a helical ridge shown in FIG. 9.

Figure 6:
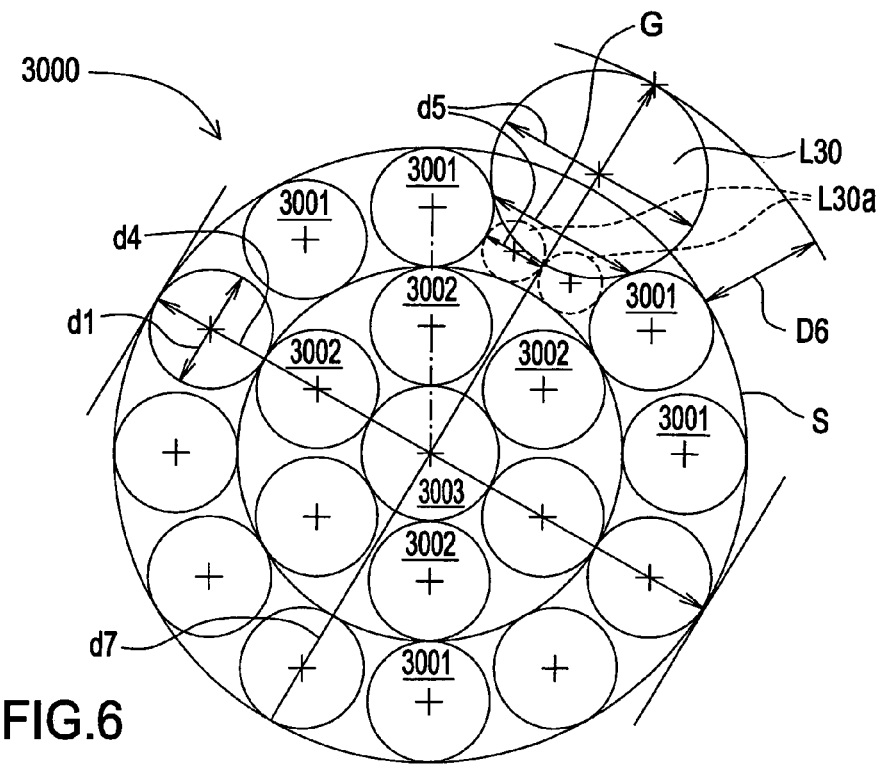
FIG. 6 is a cross sectional, schematic view of another embodiment of a reduced drag cable.
Figure 8:
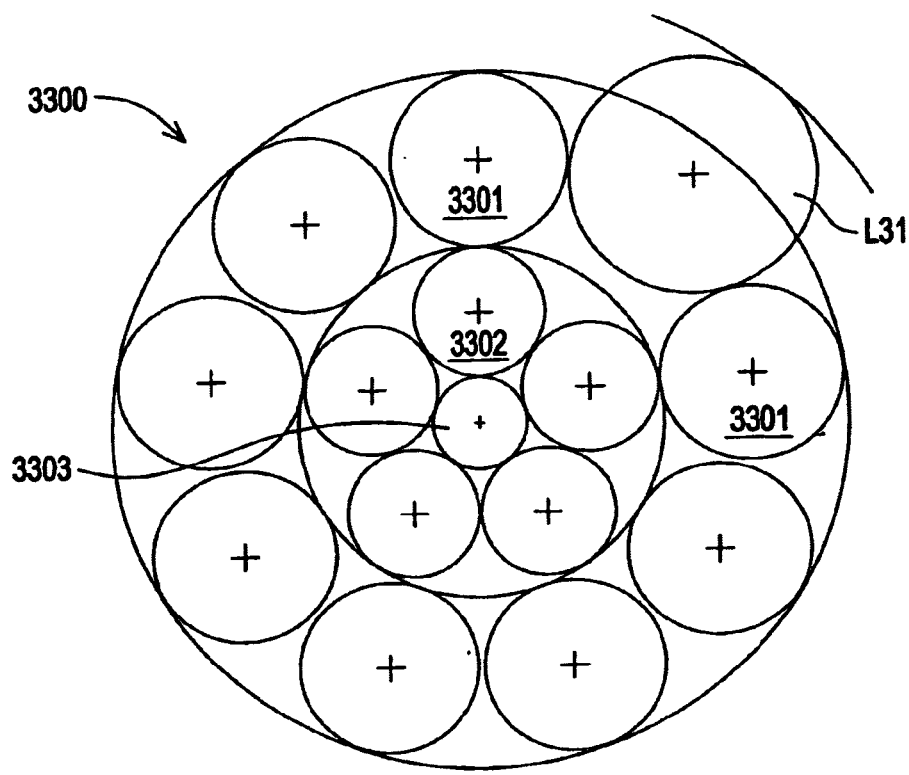
FIG. 8 is a cross sectional, schematic view of another embodiment of a reduced drag cable with two smaller wires.

Referring next to FIG. 6 cable 3000 has a larger outer perimeter strand solid line L30 with a diameter of $d_5$. In the depicted embodiment $d_5$ is 0.8636 mm (0.034"). $D_1$ is the same as in FIG. 5. The ratio $D_5/D_1$ is about 1.79. Length $d_6$ is about 0.5055 mm (0.0199 inch) above the perimeter surface extent S in the depicted embodiment.

Figure 10:
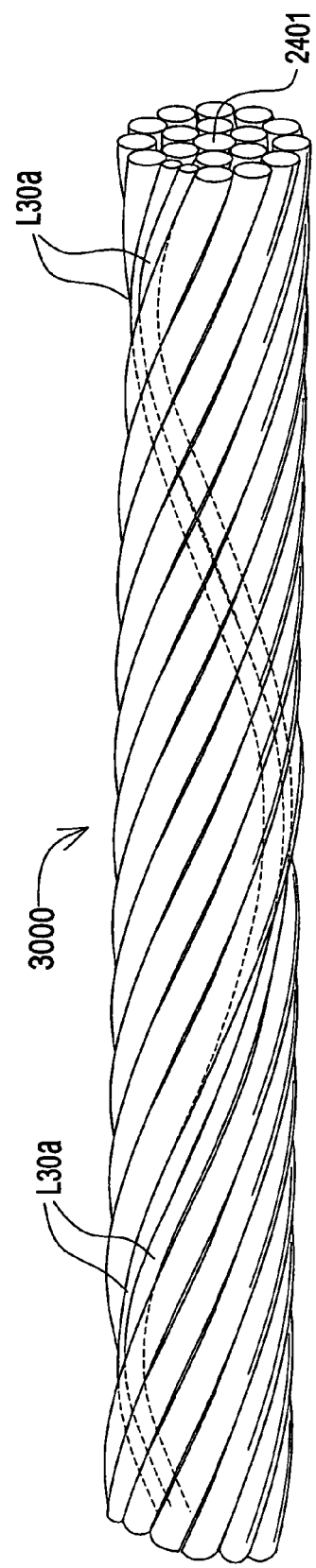
FIG. 10 is a perspective view of a cable with two smaller strands.

Also shown in FIG. 6, strands L30a are shown in dotted lines with a diameter d5 of less than 50% of D1. In this embodiment, two or more strands L30a will be used to hold open gap G. Cable 300 with two strands L30a is shown in a perspective view with gap G forming a helical groove in FIG. 10.

Figure 7:
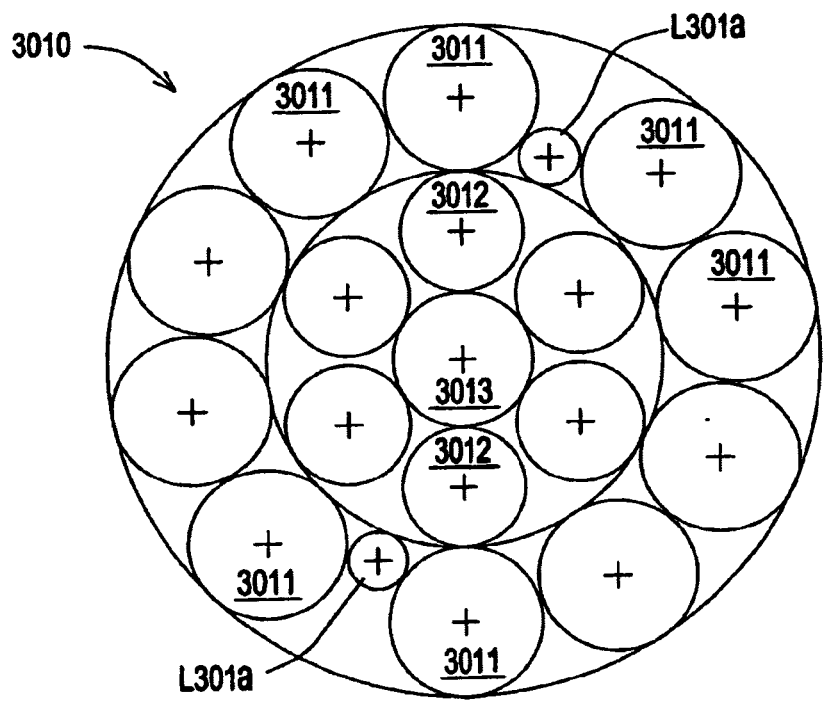
FIG. 7 is a cross sectional, schematic view of another embodiment of a reduced drag cable with a single larger wire.

In FIG. 7, another embodiment of the cable 3010 is shown. The outer strands 3011, the inner strands 3012 and 3013 form the main structure of the cable 3010. Strands L301a have a diameter of less than 50% of the diameter of 3011. Instead of both strands L301a being in a single gap G, as in FIG. 6, strands L301a are placed on either side of strand 3010, forming two helical grooves.

Figure 9:
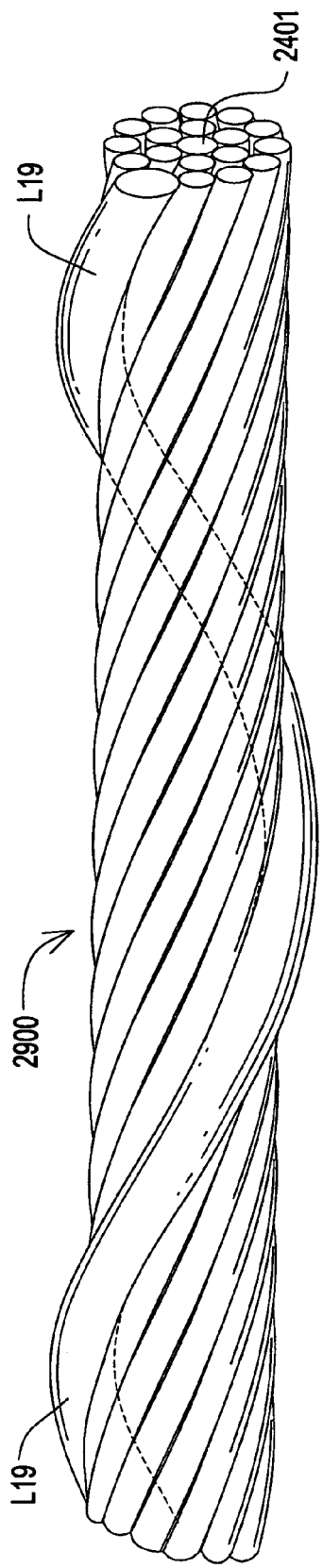
FIG. 9 is a perspective view of a cable with a large strand.

Referring next to FIG. 9 the helical ridge of L19 is seen in perspective.

In operation of the wind tunnel, air over 20 MPH passes at about a 90° angle to the cable which forms a cable floor/safety net shown in FIGS. 22 (2202) and 26 (2601). In all of the disclosed wires the direction the air flow comes from is not critical for the functioning of the device. Other than airflow going directly down the length of the cable, all other directions of air flow over the cable are believed to result in at least some reduction of drag.

FIG. 9 shows a cable 3300 with 15 strands. Strands 3301 form the outer premier with L31. Strands 3302 and 3303 form the inner core of cable 3300. L31 could be smaller in diameter than strand L31 (not shown).

The cables shown in FIGS. 2 through 10 can be used in any wind tunnel or other environment where it is desirable to employ a cable that suffers less than the normal drag when it passes through the air or when air passes over the cable, not just in re-circulating wind tunnels.

Figure 11:
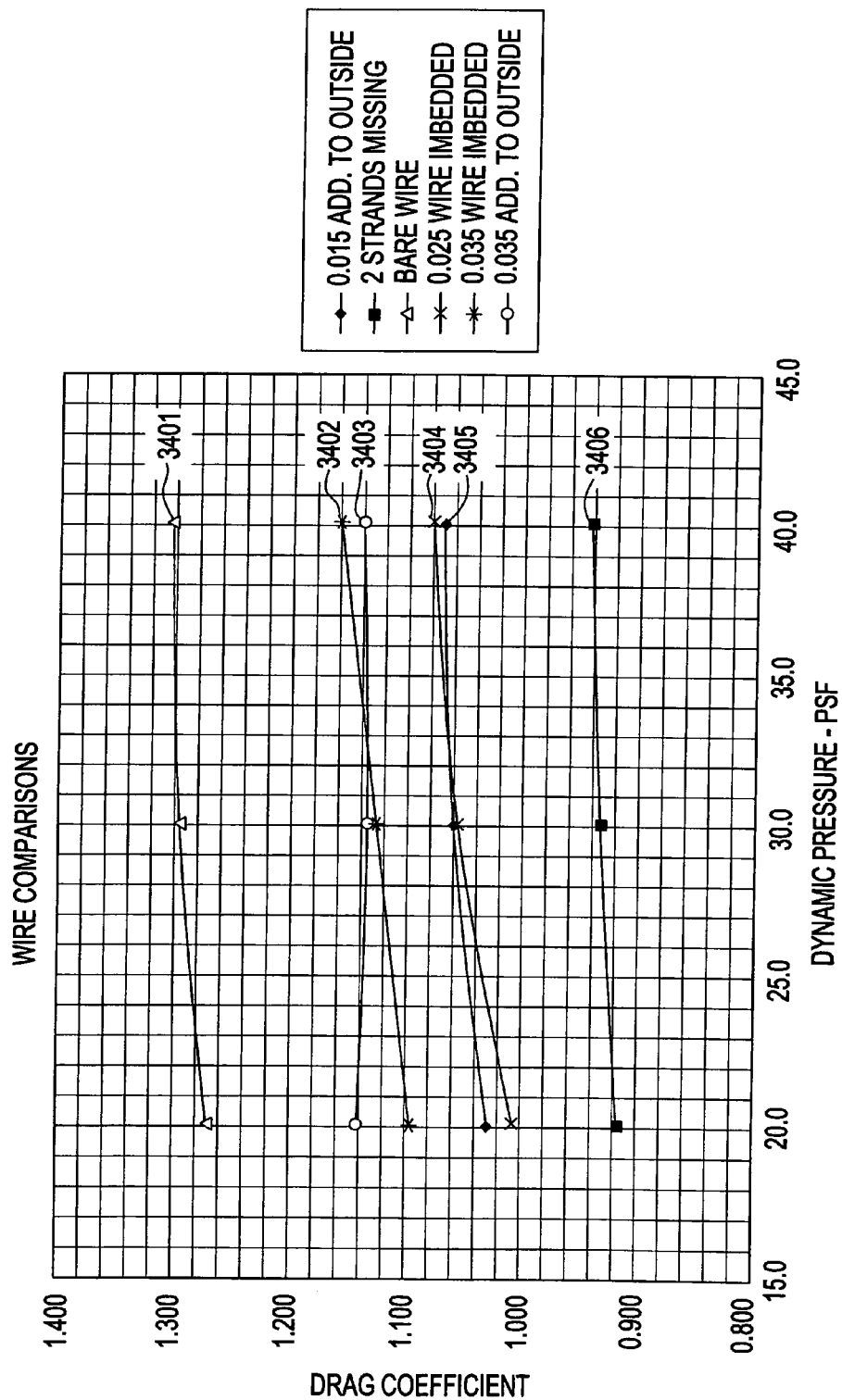
FIG. 11 is a graph showing the reduction in drag of some of the disclosed cables.

FIG. 11 is a graph showing the drag coefficient of different cables as a function of the dynamic pressure. In all of the test cables, all most of the strands in the cable were approximately 0.019 inch in diameter. Line 3401 shows a standard twisted wire cable. Lines 3403 and 3405 show cables 2300 with helical strand 2302 wrapped around the perimeter. Line 3402 shows a strand as in FIG. 6 with a $d_5$ of 0.035 inches. Line 3404 shows a strand as in FIG. 5 with a $d_2$ of 0.025.

the disclosed cables generally do not cost any appreciable amount more to manufacture than a standard cable of the same size. Therefore, any reduction in drag and noise and any corresponding savings in energy consumption that results from the use of this low drag cable will result in a direct cost savings.

Although the present device has been described with reference to depicted embodiments, numerous modifications and variations can be made and still the result will come within the scope of the invention. No limitation with respect to the specific embodiments disclosed herein is intended or

I claim:

1. In a vertical wind tunnel having a flight chamber for supporting a person in flight in a column of high speed air, said flight chamber having a safety net floor, wherein the safety net is made of cables, an improvement comprising:
   said safety net cables further comprising at least one cable having a twisted multi-strand construction;
   a portion of the strands forming the perimeter of the cable:
   wherein at least one of the perimeter strands having a diameter different than an average of all the other perimeter strand diameters; and
   wherein said different diameter strand forms a helical feature around an outer surface of the cable, thereby reducing the aerodynamic drag of the cable in air.

2. The apparatus of claim 1, wherein the at least one cable with the at least one different diameter strand further comprises only one larger diameter strand, and the helical feature being a ridge, wherein all the rest of the perimeter strands are of equal diameters.

3. The apparatus of claim 1, wherein the at least one cable with the at least one different diameter strand further comprises at least one smaller diameter strand and the helical feature being a groove, wherein all the rest of the perimeter strands are of equal diameters.

4. The apparatus of claim 2, wherein all the strands are made of steel.

5. The apparatus of claim 2, wherein this one larger diameter strand has a diameter of about 0.028 inches with all the other perimeter strands having a diameter of about 0.019 inches with the total number of strands being 19 of which 11 are perimeter strands.

6. The apparatus of claim 2, wherein the one larger diameter strand has a diameter of about 0.034 inches with all the other perimeter strands having a diameter of about 0.019 inches with the total number of strands being 19 of which 11 are outer perimeter strands.

7. In a wind tunnel having a net therein, an improvement comprising;
   said net having a multi-strand metal cable;
   said multi-strand metal cable having an outer perimeter group of strands;
   wherein at least one of said outer perimeter strands has a diameter different than all the other strands of the outer perimeter; and
   wherein a helical feature is formed on the outer perimeter of the metal cable by the different diameter strand(s) thereby reducing the aerodynamic drag of the cable in air.

8. The apparatus of claim 7, wherein the metal cable with the at least one different diameter outer perimeter strand further comprises only one larger diameter outer perimeter strand, wherein all the rest of the perimeters strands in the metal cable are of equal diameters.

9. The apparatus of claim 7, wherein the metal cable with the at least one different diameter outer perimeter strand further comprises at least one smaller diameter outer perimeter strand, wherein all the rest of the perimeters strands in the metal cable are of equal diameters.

10. The apparatus of claim 7, wherein all the strands are made of steel.

11. The apparatus of claim 8, wherein the one larger diameter strand has a diameter of about 0.028 inches with all the other perimeter strands having a diameter of about 0.019 inches with the total number of strands being 19 of which 11 are outer perimeter strands.

12. The apparatus of claim 8, wherein the one larger diameter strand has a diameter of about 0.034 inches with all the other perimeter strands having a diameter of about 0.019 inches with the total number of strands being 19 of which 11 are outer perimeter strands.

13. A cable designed for use in applications when it is advantageous to reduce the amount of aerodynamic drag in air caused by the cable, the cable being formed from a multiplicity of a plurality of elongated metal elements twisted together, one of a set of outer elements having a cross-section which is larger than all other outer elements, said all other outer elements defining an outer surface of the cable which has a predetermined circumferential length, said one element having a cross-sectional size and shape such that it projects from said outer surface a distance above said predetermined circumferential length so as to form a helical ridge around the cable, thereby reducing the aerodynamic drag of the cable in air.

14. A cable as claimed in claim 13, wherein said outer surface is substantially circular defining a cable diameter D, and said one element which projects from said outer surface by a distance equal to at least about 10% of D.

15. A cable designed for use in applications when it is advantageous to reduce the amount of aerodynamic drag in air caused by the cable, the cable being formed from a multiplicity of a plurality of elongated metal elements twisted together, at least one of a set of outer elements having a cross-section which is smaller than all other outer elements, said all other outer elements defining an outer surface of the cable which has a predetermined circumferential length, said one element having a cross-sectional size and shape such that it indents from said outer surface a distance below said predetermined circumferential length so as to form at least one helical grove around the cable, thereby reducing the aerodynamic drag of the cable in air.

* * * * *